(12) United States Patent
Nakano et al.

(10) Patent No.: US 10,351,693 B2
(45) Date of Patent: *Jul. 16, 2019

(54) GLASS-FIBER-REINFORCED THERMOPLASTIC RESIN MOLDING PRODUCT, AND PRODUCTION METHOD THEREFOR

(71) Applicant: SUMITOMO RIKO COMPANY LIMITED, Komaki-shi, Aichi (JP)

(72) Inventors: Masayoshi Nakano, Owariasahi (JP); Junichiro Suzuki, Komaki (JP); Motoshige Hibino, Komaki (JP); Kei Okumura, Kakamigahara (JP); Wakako Michiyama, Komaki (JP); Yasuhiro Komiya, Kasugai (JP)

(73) Assignee: SUMITOMO RIKO COMPANY LIMITED, Komaki-shi (JP)

( * ) Notice: Subject to any disclaimer, the term of this patent is extended or adjusted under 35 U.S.C. 154(b) by 95 days.

This patent is subject to a terminal disclaimer.

(21) Appl. No.: 14/729,540

(22) Filed: Jun. 3, 2015

(65) Prior Publication Data

US 2015/0259511 A1    Sep. 17, 2015

Related U.S. Application Data

(63) Continuation of application No. PCT/JP2014/073273, filed on Sep. 4, 2014.

(30) Foreign Application Priority Data

Sep. 27, 2013 (JP) .................... 2013-201860

(51) Int. Cl.
*C08K 7/14* (2006.01)
*C08L 65/00* (2006.01)
(Continued)

(52) U.S. Cl.
CPC ............ *C08K 7/14* (2013.01); *B29C 45/0001* (2013.01); *C08J 5/043* (2013.01); *C08L 65/00* (2013.01);
(Continued)

(58) Field of Classification Search
None
See application file for complete search history.

(56) References Cited

U.S. PATENT DOCUMENTS 4,238,266 A    12/1980   Steinberg et al.
6,096,818 A *   8/2000   Nakaura ................. C08K 3/04
                                                  252/511

(Continued)

FOREIGN PATENT DOCUMENTS

AU      2002301429 B2    3/2003
DE         2213305 A1    9/1972
(Continued)

OTHER PUBLICATIONS

English machine translation of WO 2001/059009, obtained on Jun. 19, 2017 from JPO.*
(Continued)

*Primary Examiner* — Callie E Shosho
*Assistant Examiner* — Krupa Shukla
(74) *Attorney, Agent, or Firm* — Westerman, Hattori, Daniels & Adrian, LLP

(57) ABSTRACT

A glass-fiber-reinforced thermoplastic resin molding product is provided, which has a ring-shaped structure, and includes a thermoplastic resin, and a fibrous filler dispersed in the thermoplastic resin. The fibrous filler includes:
(A) 40 to 80% of glass fibers each having a length of at least 0.05 mm and less than 0.5 mm;
(B) 15 to 40% of glass fibers each having a length of at least 0.5 mm and less than 1.0 mm;
(C) 5 to 30% of glass fibers each having a length of at least 1.0 mm and less than 3.0 mm; and
(D) at most 1% of glass fibers each having a length of at least 3.0 mm,
based on the total number of fibers of the fibrous filler present in the molding product.

12 Claims, 1 Drawing Sheet

(51) Int. Cl.
    *B29C 45/00*     (2006.01)
    *C08J 5/04*     (2006.01)
    *B29K 77/00*     (2006.01)
    *B29K 309/08*     (2006.01)
    *B29L 31/04*     (2006.01)
    *B29L 31/06*     (2006.01)
    *B29L 31/00*     (2006.01)

(52) U.S. Cl.
    CPC ...... *B29K 2077/00* (2013.01); *B29K 2309/08* (2013.01); *B29L 2031/045* (2013.01); *B29L 2031/06* (2013.01); *B29L 2031/772* (2013.01); *C08G 2261/342* (2013.01); *C08J 2377/06* (2013.01); *C08K 2201/004* (2013.01)

(56) References Cited

U.S. PATENT DOCUMENTS

| | | | |
|---|---|---|---|
| 2002/0099124 A1* | 7/2002 | Patel ...................... | C08K 5/523 524/445 |
| 2004/0012121 A1 | 1/2004 | Lang et al. | |
| 2004/0023012 A1* | 2/2004 | Kia ......................... | B29C 70/30 428/212 |
| 2007/0122615 A1* | 5/2007 | Mutsuda .................. | B32B 7/10 428/375 |
| 2009/0131208 A1* | 5/2009 | Hawryluck ........... | F16H 7/1218 474/135 |
| 2011/0124789 A1 | 5/2011 | Choi et al. | |
| 2012/0235334 A1 | 9/2012 | Suzuki | |
| 2015/0259511 A1 | 9/2015 | Nakano et al. | |
| 2017/0121838 A1 | 5/2017 | Tatebe et al. | |

FOREIGN PATENT DOCUMENTS

| | | | |
|---|---|---|---|
| GB | 1392175 A | | 4/1975 |
| JP | 51-46357 A | | 4/1976 |
| JP | 62-268612 A | | 11/1987 |
| JP | 8-269228 A | | 10/1996 |
| JP | 2001-179738 A | | 7/2001 |
| JP | 2002-003691 A | | 1/2002 |
| JP | 2002-53711 A | | 2/2002 |
| JP | 2003-285323 A | | 10/2003 |
| JP | 2005-297338 A | | 10/2005 |
| JP | 2005-298663 A | | 10/2005 |
| JP | 2005-298664 A | | 10/2005 |
| JP | 2005-532934 A | | 11/2005 |
| JP | 2010-189637 A | | 9/2010 |
| JP | 2010-248494 | | 11/2010 |
| JP | 2010-538104 A | | 12/2010 |
| JP | 2012-25844 A | | 2/2012 |
| JP | 2016-166276 A | | 9/2016 |
| WO | 01/59009 A1 | | 8/2001 |
| WO | WO 2001/059009 | * | 8/2001 |
| WO | 2012/124060 A1 | | 9/2012 |

OTHER PUBLICATIONS

Office Action dated Jun. 29, 2016 issued in counterpart German application No. 112014001601.2 (with English translation, 7 pages).
International Preliminary Report on Patentability dated Mar. 29, 2016, issued in counterpart international application No. PCT/JP2014/073273 (English version, 7 pages).
International Search Report dated Dec. 16, 2014, issued in corresponding International Application No. PCT/JP2014/073273; with English translation (4 pages).
Office Action dated Sep. 23, 2016 issued in counterpart German patent application No. 112014001601.2 (with English translation, 7 pages).
"Nylon 66 (Polymide 66) Long Fiber Reinforced Thermoplastic Composites", obtained Oct. 12, 2017, PlastiComp, Inc., http://www.plasticomp.com/data-sheets-nylon-66/.
Final Office Action dated Oct. 17, 2017, issued in U.S. Appl. No. 15/378,210 (25 pages).
Office Action dated May 31, 2017 issued in counterpart Chinese patent application No. 201480042083.9 (with English translation, 10 pages).
Satoh, K. et al,"The Generation Mechanism of Material Property Distribution for Thin FRP Products During Injection Molding—Influence of Cavity Thinning on Fiber Breakage", Journal of the Japan Society of Polymer Processing, 2006, vol. 18, No. 3, pp. 227-237; English Abstract only. (1 page).
Furuhashi, H. et al, "The Generation Mechanism of Material Property Distribution induced by Fiber Behavior for FRP Products during Injection Molding—Detailed Analysis of Fiber Lengh Distribution in Thin Plates", Journal of the Japan Society of Polymer Processing, 2009, vol. 21, No. 4, pp. 221-216; English Abstract only. (1 page).
International Search Report dated Jun. 14, 2016, issued in International Application No. PCT/JP2016/057620. (3 pages).
Non-Final Office Action dated Jun. 26, 2017, issued in U.S. Appl. No. 15/378,210 (26 pages).
Notification of Transmittal of Copies of Translation of the International Preliminary Report on Patentability (Form PCT/IB/338) issued in International Application No. PCT/JP2016/057620 dated Oct. 5, 2017, with Forms PCT/IB/373 and PCT/ISA/237. (11 pages).
Non-Final Office Action dated May 22, 2018, issued in U.S. Appl. No. 15/378,210 (28 pages).

* cited by examiner

GLASS-FIBER-REINFORCED THERMOPLASTIC RESIN MOLDING PRODUCT, AND PRODUCTION METHOD THEREFOR

RELATED APPLICATION

This application is a continuation of International Application No. PCT/JP2014/73273, filed on Sep. 4, 2014, which claims priority to Japanese Patent Application No. 2013-201860, filed on Sep. 27, 2013, the entire contents of each of which are hereby incorporated by reference.

BACKGROUND

Field of the Invention

The present invention relates to a glass-fiber-reinforced thermoplastic resin molding product having a strength improved by dispersing glass fibers therein, and a production method therefor. More specifically, the invention relates to a glass-fiber-reinforced thermoplastic resin molding product which has a ring-shaped structure and exhibits excellent performance for use as a mount, a bush or a torque rod.

Description of the Related Art

Parts for use in automotive engine rooms are required to have sufficient physical properties, e.g., sufficient strength, water resistance, heat resistance and resistance to calcium chloride (which is used as a snow melting agent), under higher temperature and higher humidity conditions. Conventionally, these parts are generally made of metal. In recent years, it has been contemplated to use automotive parts made of a fiber-reinforced resin (FRP) instead of the metal automotive parts to meet a need for weight reduction. Particularly, a glass fiber reinforcement thermoplastic resin containing glass fibers dispersed therein is excellent in versatility, processability, moldability and the like and advantageous in terms of costs and, therefore, is expected to find applications in the aforementioned field. A glass-fiber-reinforced thermoplastic resin molding product is typically produced by melt-kneading the thermoplastic resin together with glass fibers, pelletizing the resulting mixture, melting the resulting pellets again and injection-molding the resulting melt (see, for example, JP-A-2012-25844, JP-A-2003-285323 and JP-A-2010-189637).

Where the intended molding product is produced by once pelletizing the glass fiber/thermoplastic resin mixture, however, the glass fibers are broken by a shear stress in a melt-kneading machine during the pelletization to be thereby reduced in size (to a fiber length of not greater than 0.5 mm), and further receives a shear stress during the injection molding to be thereby further reduced in size. Therefore, the glass fibers present in the molding product thus produced are excessively reduced in size, so that the molding product strength improving effect is problematically reduced.

To cope with this, it is contemplated to use filament reinforcement resin pellets (pellets containing glass filaments prepared as each having a longer fiber length by a drawing method). However, this adversely influences the moldability and, where a molding product such as a mount, a bush or a torque rod having a ring-shaped structure is produced, the molding product has a greater residual stress in the presence of the filaments. Further, a resin having a lower molecular weight should be used to increase the penetrability of the resin to the glass filaments. Problematically, this makes it impossible to impart the molding product with sufficient strength. JP-A-2003-285323 and JP-A-2010-189637 propose methods in which filament reinforcement resin pellets and staple fiber reinforcement resin pellets are mixed together and the resulting mixture is used for the molding. This improves the moldability, but the problem associated with the residual stress is not solved because the fiber length distribution has a double peak profile.

Where the molding product molded from the conventional glass fiber reinforcement thermoplastic resin as having the ring-shaped structure has a smaller wall thickness, the molding product problematically has a reduced mechanical strength, particularly, in a high temperature atmosphere or in a moisture absorbed state. This problem is solved by increasing the wall thickness of the molding product, but the weight reducing effect is problematically reduced.

WO2012/124060 proposes a method for producing an intended molding product by preparing fiber reinforcement resin materials for a skin layer and a core layer respectively having different flexural elastic moduli and sandwich-molding the materials to solve the aforementioned problem. However, the sandwich-molded product has a layer interface and, therefore, is liable to have an insufficient strength. Further, the sandwich-molding requires a special molding machine, thereby increasing production costs.

In view of the foregoing, a glass-fiber-reinforced thermoplastic resin molding product is provided, which has excellent mechanical strength in a high temperature atmosphere or in a moisture absorbed state even without imparting the molding product with a greater wall thickness or taking other measures, and has sufficient distortion resistance and sufficient strength as required for a ring-shaped structure, and a production method therefor is provided.

SUMMARY

According to a first inventive aspect to achieve the object described above, there is provided a glass-fiber-reinforced thermoplastic resin molding product having a ring-shaped structure and including a thermoplastic resin and a fibrous filler dispersed in the thermoplastic resin, the fibrous filler including:

(A) 40 to 80% of glass fibers each having a length of at least 0.05 mm and less than 0.5 mm;
(B) 15 to 40% of glass fibers each having a length of at least 0.5 mm and less than 1.0 mm;
(C) 5 to 30% of glass fibers each having a length of at least 1.0 mm and less than 3.0 mm; and
(D) at most 1% of glass fibers each having a length of at least 3.0 mm,
based on the total number of fibers of the fibrous filler present in the molding product.

According to a second inventive aspect, there is provided a method for producing the glass-fiber-reinforced thermoplastic resin molding product of the first inventive aspect, the method including the steps of: directly feeding glass fibers and a thermoplastic resin in an injection-molding machine; and injection-molding the resulting mixture into an intended glass-fiber-reinforced thermoplastic resin molding product.

The inventors of the present invention conducted intensive studies to solve the aforementioned problems. As a result, the inventors focused on the lengths of reinforcement fibers contained in a glass-fiber-reinforced thermoplastic resin molding product having a ring-shaped structure and found that, where the reinforcement fibers have a specific glass fiber length distribution defined by the glass fibers (A) to (D) described above, the glass-fiber-reinforced thermoplastic resin molding product has excellent mechanical strength in the high temperature atmosphere or in the moisture absorbed state even without imparting the molding product with a greater wall thickness design or taking other measures, and has sufficient distortion resistance and sufficient strength as required for the ring-shaped structure, and attained the present invention.

It is difficult to provide the specific glass fiber length distribution described above by the conventional method in which the mixture of the glass fibers and the thermoplastic resin is once pelletized and then the resulting pellets are used for the injection molding or the like to produce the molding product. Then, the inventors found that, where the intended glass-fiber-reinforced thermoplastic resin molding product is produced by the method in which the glass fibers and the thermoplastic resin are directly fed into the injection molding machine and the resulting mixture is injection-molded, it is possible to facilitate the production of the molding product having the specific glass fiber length distribution defined by the glass fibers (A) to (D).

As described above, the inventive glass-fiber-reinforced thermoplastic resin molding product has the ring-shaped structure, and contains the fibrous filler including the aforementioned percentages of the glass fibers (A) to (D) having the aforementioned fiber lengths and dispersed in the thermoplastic resin. Therefore, the glass-fiber-reinforced thermoplastic resin molding product has excellent mechanical strength in the high temperature atmosphere or in the moisture absorbed state even without imparting the molding product with a greater wall thickness design or taking other measures, and has sufficient distortion resistance and sufficient strength as required for the ring-shaped structure. Where the molding product is used as an automotive bearing part such as an engine mount, a bush or a torque rod, for example, the molding product exhibits excellent performance.

The inventive glass-fiber-reinforced thermoplastic resin molding product having the specific glass fiber length distribution defined by the glass fibers (A) to (D) can be advantageously produced by the specific method in which the glass fibers and the thermoplastic resin are directly fed into the injection molding machine and the resulting mixture is injection-molded.

DETAILED DESCRIPTION OF PARTICULAR EMBODIMENTS

Figure 1A:
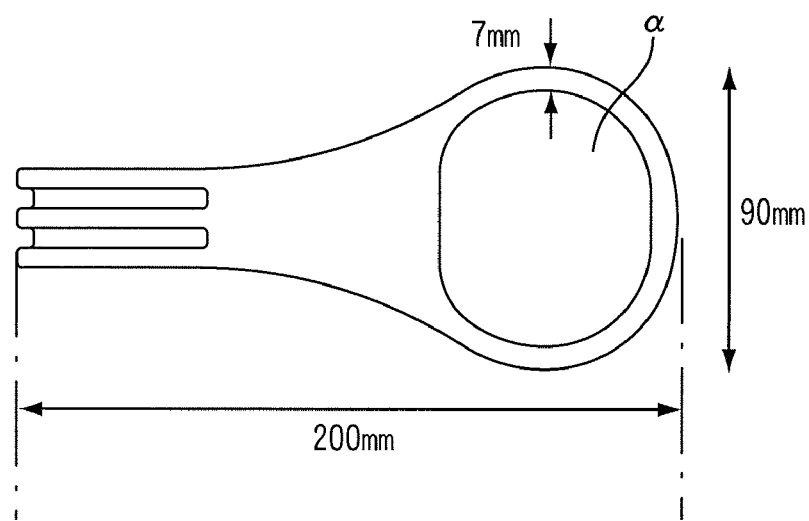
FIGS. 1A and 1B are a top plan view and a side view, respectively, showing the construction of a test piece produced in Examples.

Next, an embodiment of the present invention will be described in detail.

The inventive glass-fiber-reinforced thermoplastic resin molding product has a ring-shaped structure. Here, the expression "having a ring-shaped structure" means that a part of the molding product may have a ring-shaped structure or the molding product may entirely have a ring-shaped structure. The ring shape may be an annular shape or a polygonal ring shape such as a pentagonal ring shape or a hexagonal ring shape.

The inventive glass-fiber-reinforced thermoplastic resin molding product includes a thermoplastic resin and a fibrous filler dispersed in the thermoplastic resin, and the fibrous filler includes:

(A) 40 to 80% of glass fibers each having a length of at least 0.05 mm and less than 0.5 mm;
(B) 15 to 40% of glass fibers each having a length of at least 0.5 mm and less than 1.0 mm;
(C) 5 to 30% of glass fibers each having a length of at least 1.0 mm and less than 3.0 mm; and
(D) at most 1% of glass fibers each having a length of at least 3.0 mm, based on the total number of fibers of the fibrous filler present in the molding product. By thus controlling the lengths and the percentages of the fibers, the residual stress due to a difference in fiber length is reduced. If a greater number of the glass fibers (D) each having a length of at least 3.0 mm are present in the molding product, the molding product having the ring-shaped structure loses its toughness and suffers from stress concentration, thereby having a reduced fracture strength. If the percentage of the glass fibers (A) each having a length of at least 0.05 mm and less than 0.5 mm is excessively great, the benefit produced by the fiber reinforcement is lost. To suppress the residual stress, it is optimal to respectively control the percentage of the glass fibers (B) each having a length of at least 0.5 mm and less than 1.0 mm and the percentage of the glass fibers (C) each having a length of at least 1.0 mm and less than 3.0 mm within the aforementioned ranges. Thus, the fiber reinforcing effect is enhanced when the molding product is in the high temperature atmosphere or in the moisture absorbed state. Therefore, the molding product has an improved strength.

The percentages of the glass fibers (A), (B), (C) and (D) respectively having the aforementioned fiber lengths are particularly preferably 50 to 70%, 20 to 40%, 10 to 30%, and at most 1%, respectively, because the resulting molding product is excellent in mechanical strength in the high temperature atmosphere or in the moisture absorbed state.

The percentages of the glass fibers (A) to (D) are based on the total number of fibers of the fibrous filler as described above, and may be each measured by a glass fiber length distribution measuring method disclosed, for example, in JP-A-2002-5924. More specifically, the molding product is ashed at a temperature of 500° C. to 700° C., and then ashed glass fibers are homogeneously dispersed in water having a weight that is 1000 times the total weight of the ashed glass fibers, and a part of the resulting homogenous dispersion is taken out in an amount such that the weight of glass fibers contained in the dispersion is 0.1 to 2 mg. Then, the glass fibers are extracted from the part of the homogenous dispersion by filtering or drying. In turn, the fiber lengths of the respective glass fibers thus extracted are measured, and the percentages (%) of the glass fibers (A) to (D) are determined based on the fiber lengths thus measured. The measurement of the lengths of the fibers may be achieved by selecting fibers at random from the asked residual fiber mass rather than by dispersing the fibers in the water. In the glass fiber length distribution measuring method disclosed in the aforementioned patent literature, the extraction of the glass fibers from the molding product is achieved by melting and asking the thermoplastic resin (the polymer of the molding product) at a high temperature, but may be achieved by dissolving the thermoplastic resin in a solvent. As apparent from the glass fiber length distribution measuring method disclosed in the aforementioned patent literature, the glass fiber length distribution defined by the glass fibers (A) to (D) does not indicate a distribution state of the glass fibers in the material (resin composition) for the molding product, but indicate a distribution state of the glass fibers in the molding product (cured resin product). The measurement of the lengths and the number of the fibers is based on an image obtained by photographing the fibers by means of a microscope.

The total proportion of the glass fibers present in the inventive glass-fiber-reinforced thermoplastic resin molding product is preferably in a range from 25 to 60 wt %, more preferably in a range from 40 to 55 wt %. This makes it possible to provide the reinforcing effect as desired. The total proportion of the glass fibers, which is not relevant to the fiber lengths, may be determined when ingredients for the molding product are prepared.

Further, the weight average fiber length of glass fibers dispersed in an inner portion of the glass-fiber-reinforced thermoplastic resin molding product is preferably greater than the weight average fiber length of glass fibers dispersed in a surface portion of the glass-fiber-reinforced thermoplastic resin molding product, and a difference between these weight average fiber lengths is preferably at least 0.1 mm. Thus, the surface portion (skin layer), which is more liable to be deformed, has a higher toughness, and the inner portion (core layer) of the molding product, which is liable to be finally broken, has a higher rigidity, whereby the glass-fiber-reinforced thermoplastic resin molding product is imparted with a higher fracture strength. Here, the surface portion (skin layer) is a portion having a depth that is up to 15% of the thickness of the molding product as measured thicknesswise from the surface of the molding product. The inner portion (core layer) of the molding product is a portion having a greater depth than the surface portion. Where the molding product is produced by the injection molding as having the specific glass fiber length distribution defined by the glass fibers (A) to (D), the molding product is easily imparted with this structure.

From this aspect, the weight average fiber length of the glass fibers dispersed in the surface portion of the glass-fiber-reinforced thermoplastic resin molding product is preferably in a range from 0.4 to 1.5 mm, more preferably in a range from 0.5 to 1.0 mm, and the weight average fiber length of the glass fibers dispersed in the inner portion of the glass-fiber-reinforced thermoplastic resin molding product is preferably in a range from 0.5 to 2.8 mm, more preferably in a range from 0.6 to 1.5 mm. Thus, the surface portion (skin layer), which is more liable to be deformed, has a higher toughness, and the inner portion (core layer) of the molding product, which is liable to be finally broken, has a higher rigidity. Thus, the glass-fiber-reinforced thermoplastic resin molding product is imparted with a higher fracture strength.

The weight average fiber lengths of the glass fibers in the skin layer and in the core layer are determined, for example, in the following manner. About 3 g of a sample is sampled from each of the layers, and heat-treated at a temperature of 500° C. to 700° C. to be asked. Then, fibers are selected at random from the residual fiber mass, and photographed by means of a microscope. Based on the resulting image, the weight average fiber length in each of the layers is determined from the following expression (1). Fibers having vague figures (having a length of less than 0.05 mm) and fibers partly extending outside the image are excluded from the measurement.

$$\text{Weight average fiber length}(Lw)=(\Sigma q i \times L i^2)/(\Sigma q i \times L i) \quad (1)$$

wherein Li is the length of a fiber and qi is the number of fibers each having a fiber length Li.

The inventive glass-fiber-reinforced thermoplastic resin molding product preferably has a number average molecular weight (Mn) of 18000 to 27000, more preferably 22000 to 25000. For determination of the number average molecular weight (Mn) after the molding, a 0.1-wt % resin solution prepared by dissolving the glass-fiber-reinforced thermoplastic resin molding product in 1,1,1,3,3,3-hexafluoro-2-propanol (HFIP) is analyzed by means of a gel permeation chromatography (GPC) analyzer.

The thermoplastic resin to be used for the inventive glass-fiber-reinforced thermoplastic resin molding product preferably has a number average molecular weight (Mn) of 19000 to 28000, more preferably 22000 to 26000. Since there is a correlation between the molecular weight and the toughness of the resin, the ring-shaped product which is significantly influenced by the toughness is required to have the lowest possible molecular weight. Further, there is a correlation between the molecular weight and the melt viscosity of the resin. Therefore, if the molecular weight is excessively high, the resin has a lower fluidity, and the ring-shaped portion of the molding product has a poorer molding stability. With the excessively high molecular weight, the resin is liable to have a lower reactivity with the fibers in the direct molding.

Examples of the thermoplastic resin to be used for the inventive glass-fiber-reinforced thermoplastic resin molding product include polyamide resins, polypropylene resins, polystyrene resins, polycarbonate resins, acrylonitrile butadiene styrene copolymer resins (ABS resins), polyethylene terephthalate resins and polybutylene terephthalate resins, among which the polyamide resins are preferred for the strength in the high temperature atmosphere, the elasticity, the melt viscosity and the like.

Examples of the polyamide resins include polyamides 6, polyamides 46, polyamides 66, polyamides 610, polyamides 612, polyamides 11, polyamides 12, polyamides 92, polyamides 99, polyamides 912, polyamides 1010, polyamides 6I, polyamides 6T, polyamides 9T, polyamides 10T, polyamides 11T, polyamides MXD6, polyamides 6T/6I, polyamides 6/6I, polyamides 66/6T, polyamides 66/6I, and polyamide copolymers including at least two polyamide components selected from polyamide components of these polyamides having different structures.

Examples of the glass fibers to be used for the inventive glass-fiber-reinforced thermoplastic resin molding product include filaments obtained by melt-spinning glass such as E glass (electrical glass), C glass (chemical glass), A glass (alkali glass), S glass (high strength glass) and alkali-proof glass. The glass fibers preferably each have a fiber diameter of 3 to 25 μm, more preferably 8 to 20 μm.

The molding product may contain a fibrous filler such as aramide fibers (AF) or carbon fibers (CF) in addition to the glass fibers dispersed in the aforementioned percentage. The proportion of the additional fibrous filler is preferably small amount, preferably the fibrous filler is essentially composed of the glass fibers. It should be noted that the proportion of the additional fibrous filler is limited to a proportion determined by subtracting the amounts of the glass fibers (A) to (D) from the amount of the overall fibrous filler.

In addition to the aforementioned ingredients, the inventive glass-fiber-reinforced thermoplastic resin molding product preferably contains terpene phenol. Terpene phenol has a higher polarity and, particularly, is incorporated into amide groups of the polyamide resin by hydrogen bonds. Therefore, the molecular chain of the resin is extended to reduce the viscosity. This improves the injection-moldability (prevents the reduction in the fiber lengths, making it easier to provide the fiber length distribution defined by the glass fibers (A) to (D)). Further, terpene phenol reduces the degree of the reaction between the amide groups of the polyamide resin and water, thereby suppressing the water absorption of the molding product and improving the resistance to calcium chloride.

Where the polyamide resin is used as the thermoplastic resin, the proportion of terpene phenol is 1 to 10 wt % based on the weight of the overall composition, thereby providing the effect of improving the injection-moldability, and the effect of improving the water absorption resistance and the calcium chloride resistance of the molding product.

As required, a heat stabilizer, an antioxidant, an inorganic filler, a nucleating agent, a pigment, a weather-proofing material, a plasticizer, a lubricant and the like may be added to the material for the inventive glass-fiber-reinforced thermoplastic resin molding product.

Then, the inventive glass-fiber-reinforced thermoplastic resin molding product is produced, for example, in the following manner.

Necessary amounts of the glass fibers and the thermoplastic resin are directly fed into an injection molding machine for each shot, and the resulting mixture is injection-molded into the intended glass-fiber-reinforced thermoplastic resin molding product. In the conventional method in which the molding product is produced by once pelletizing the mixture of the glass fibers and the thermoplastic resin and using the resulting pellets for injection-molding, it is very difficult to provide the specific glass fiber length distribution specified by the present invention. That is, the aforementioned direct molding method obviates the need for the kneading step, thereby preventing the reduction in the fiber lengths of the glass fibers. Thus, the specific fiber length distribution defined by the glass fibers (A) to (D) can be easily provided. In this production method, the number of thermal histories is smaller by one than in the conventional pelletization production method. Therefore, reduction in molecular weight during the molding is minimized, thereby significantly improving the strength of the ring-shaped product.

In the inventive production method, it is particularly preferred to directly feed terpene phenol into the injection molding machine and injection-molding the resulting mixture in order to reduce the viscosity and further improve the injection-moldability.

The glass fibers to be used in the inventive production method typically each have a fiber length of 2 to 6 mm, preferably 3 mm.

The inventive glass-fiber-reinforced thermoplastic resin molding product thus produced has excellent mechanical strength in the high temperature atmosphere or in the moisture absorbed state even without imparting the molding product with a greater wall thickness or taking other measures, and has sufficient distortion resistance and sufficient strength as required for the ring-shaped structure. Therefore, the inventive glass-fiber-reinforced thermoplastic resin molding product is advantageously used as an automotive bearing part. Examples of the automotive bearing part include bearing parts for a support shaft and bearing parts for a rotation shaft. Specific preferred examples of the bearing parts include transmission mounts, body mounts, carburetor mounts, member mounts, differential mounts, connecting rods, torque rods, torsional dampers, steering rubber couplings, tension rod bushes, bushes, bound stoppers, FF engine roll stoppers, muffler hangers, stabilizer link rods, radiator supports, control arms and suspension arms for motor vehicles such as automobiles, and other automotive bearing parts each having a ring-shaped structure.

EXAMPLES

Next, inventive examples will be described in conjunction with comparative examples. It should be understood that the present invention be not limited to these examples within the scope of the present invention.

The following ingredients were prepared for the inventive examples and the comparative examples.

[PA(i)]
Polyamide 66 (PA66) pellets having a number average molecular weight (Mn) of 25000 (LEONA 1402S available from Asahi Kasei Chemicals Corporation)

[PA(ii)]
Polyamide 66 (PA66) pellets having a number average molecular weight (Mn) of 21000 (AMILAN CM3007 available from Toray Industries, Inc.)

[PP(i)]
Polypropylene (PP) pellets (SUMITOMO NOBLEN AZ564 available from Sumitomo Chemical Co., Ltd.)

[GF(i)]
Glass fibers prepared by cutting glass rovings having a diameter of 17 µm (T-429N available from Nippon Electric Glass Co., Ltd.) to a length of 3 mm

[GF(ii)]
Glass fibers prepared by cutting glass rovings having a diameter of 17 µm (T-429N available from Nippon Electric Glass Co., Ltd.) to a cut length of 10 mm

[GF(iii)]
Glass chopped strands having a diameter of 13 µm and a cut length of 3 mm (T-480 available from Nippon Electric Glass Co., Ltd.)

[Staple-Fiber-Reinforced PA]
Staple-fiber-reinforced PA66GF50 having an Mn of 25000 (LEONA 14G50B available from Asahi Kasei Chemicals Corporation)

[Filament-Reinforced PA]
Filament-reinforced PA66GF50 having an Mn of 18500 (PLASTRON PA66-GF50 available from. Daicel Polymer Corporation)

[Staple-Fiber-Reinforced PP]
Staple-fiber-reinforced PP66GF50 (SUMISTRAN PG5003 available from Sumitomo Chemical Co., Ltd.)

[Filament-Reinforced PP]
Filament-reinforced PPGF50 (PLASTRON PP-GF50-02 available from Daicel Polymer Corporation)

[Terpene Phenol]
Y'S POLYSTAR K125 available from Yasuhara Chemical Co., Ltd.

Examples 1 to 4 and Comparative Examples 1 to 6

Figure 1B:
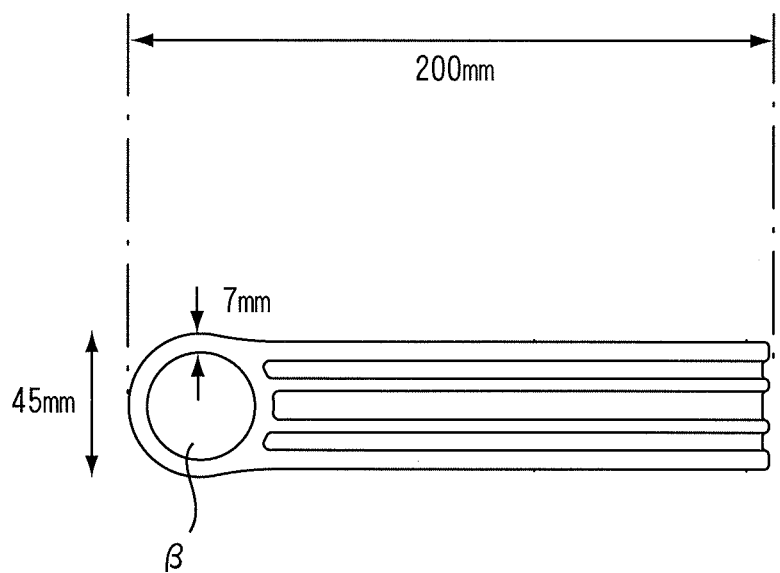

Test pieces (torque rods) each configured and dimensioned as shown in a top plan view of FIG. 1A and a side view of FIG. 1B were each produced by directly feeding the aforementioned ingredients in proportions shown below in Tables 1 and 2 into an injection molding machine and injection-molding the resulting mixture under the following molding conditions.

<<Molding Conditions>>
Injection molding machine: TM-280HW (ϕ68 mm) available from Toyo Seiki Manufacturing Co., Ltd.
Cylinder temperature: 310° C.±10° C.
Mold temperature: 80° C.±20° C.
Injection rate: 39±5 cm²/sec
Retention pressure: 80 MPa
Screw back pressure: 5 MPa
The test pieces thus produced in Examples and Comparative Examples were evaluated for physical properties based on the following criteria. The results are also shown below in Tables 1 and 2.

[Fiber Length Distribution]

The test pieces were each heat-treated at 600° C. for 3 hours by means of an electric furnace (Muffle Furnace FO810 available from Yamato Scientific Co., Ltd.) to be asked. Fibers were selected at random from residual fiber mass, and photographed at a magnification of 50 to 100 by means of a microscope (VHW-1000 available from Keyence Corporation) (three to five photographs were taken, and 300 to 500 fibers were observed in total). The fiber lengths of all the glass fibers present in the photographs were measured, and the percentages (%) of the following glass fibers (A) to (D) based on the total number of the glass fibers were determined. Fibers having unclear shapes (having a length of less than 0.05 mm) and fibers partly extending outside the images were excluded from the measurement.

(A) Glass fibers each having a length of at least 0.05 mm and less than 0.5 mm
(B) Glass fibers each having a length of at least 0.5 mm and less than 1.0 mm
(C) Glass fibers each having a length of at least 1.0 mm and less than 3.0 mm
(D) Glass fibers each having a length of at least 3.0 mm

[Weight Average Fiber Length]

About 3 g of a skin layer (a portion having a thickness up to 15% of the thickness of the molding product as measured thicknesswise from the surface of the test piece) and about 3 g of a core layer (an inner portion having a thickness of 15 to 85% of the thickness of the molding product as measured thicknesswise from the surface of the test piece) were sampled from each of the test pieces, and heat-treated at 600° C. for 3 hours by means of an electric furnace (Muffle Furnace FO810 available from Yamato Scientific Co., Ltd.) to be asked. Fibers were selected at random from residual fiber mass, and photographed at a magnification of 50 to 100 by means of a microscope (VHW-1000 available from Keyence Corporation) (three to five photographs were taken, and 300 to 500 fibers were observed in total). The weight average fiber lengths of the fibers in the skin layer and the core layer were determined from the following expression (1) based on the images of the photographs. Fibers having vague figures (having a length of less than 0.05 mm) and fibers partly extending outside the images were excluded from the measurement.

$$\text{Weight average fiber length}(Lw) = (\Sigma qi \times Li^2)/(\Sigma qi \times Li) \quad (1)$$

wherein Li is the length of a fiber and qi is the number of fibers each having a fiber length Li.

[Average Molecular Weight after Molding]

A 0.1-wt % resin solution prepared by dissolving each of the test pieces in 1,1,1,3,3,3-hexafluoro-2-propanol (HFIP) was analyzed by means of a GPC analyzer (EcoSEC HLC-8320GPC available from Tosoh Corporation, and the number average molecular weight (Mn) of the test piece was determined.

[Fracture Strength]

After rubber jigs each including a tubular pipe provided in a middle portion thereof and having an inner diameter of 20 mm, an outer diameter of 25 mm and a length of 45 mm were respectively attached to ring portions (indicated by α and β in FIGS. 1A and 1B) at opposite ends of each of the test pieces, a tensile tester (AUTOGRAPH AG-IS available from Shimadzu Corporation) was fixed to holes of the tubular pipes, and a tensile test was performed by pulling the ring portions at 5 mm/min. Thus, the fracture strength (kN) of the test piece was measured. The measurement was performed at an ordinary temperature (25° C.) and in a high temperature atmosphere (at 100° C.).

TABLE 1

| | Example | | | Comparative Example | | | |
|---|---|---|---|---|---|---|---|
| (wt %) | 1 | 2 | 3 | 1 | 2 | 3 | 4 |
| PA(i) | 50 | 47.5 | — | — | — | — | 50 |
| PA(ii) | — | — | 50 | — | — | — | — |
| GF(i) | 50 | 50 | 50 | — | — | — | — |
| GF(ii) | — | — | — | — | — | — | 50 |
| Staple-fiber-reinforced PA | — | — | — | 100 | — | 50 | — |
| Filament-reinforced PA | — | — | — | — | 100 | 50 | — |
| Terpene phenol | — | 2.5 | — | — | — | — | — |
| Fiber length distribution (%) | | | | | | | |
| A | 64 | 62 | 50 | 90 | 40 | 65 | 46 |
| B | 22 | 22 | 31 | 10 | 35 | 25 | 24 |
| C | 14 | 16 | 19 | 0 | 22 | 8 | 28 |
| D | 0 | 0 | 0 | 0 | 3 | 2 | 2 |
| Weight average fiber length (mm) | | | | | | | |
| Skin layer | 0.8 | 0.9 | 1.3 | 0.3 | 1.7 | 1.2 | 1.6 |
| Core layer | 1.1 | 1.2 | 1.6 | 0.3 | 2 | 1.6 | 1.8 |
| Average molecular weight (Mn) after molding | 24000 | 24000 | 20000 | 24000 | 17500 | 21000 | 24000 |
| Fracture strength (kN) | | | | | | | |
| At 25° C. | 28 | 27 | 26 | 23 | 18 | 22 | 22 |
| At 100° C. | 20 | 20 | 19 | 15 | 16 | 15 | 15 |

TABLE 2

| | | Comparative Example | |
|---|---|---|---|
| (wt %) | Example 4 | 5 | 6 |
| PP(i) | 50 | — | — |
| GF(iii) | 50 | — | — |
| Staple-fiber-reinforced PP | — | 100 | — |
| Filament-reinforced PP | — | — | 100 |
| Fiber length distribution (%) | | | |
| A | 46 | 89 | 43 |
| B | 35 | 11 | 30 |
| C | 19 | 0 | 23 |
| D | 0 | 0 | 4 |
| Weight average fiber length (mm) | | | |
| Skin layer | 1.1 | 0.3 | 1.8 |
| Core layer | 1.3 | 0.3 | 2.1 |
| Fracture strength (kN) | | | |
| At 25° C. | 16 | 12 | 12 |
| At 100° C. | 8 | 5 | 6 |

The above results indicate that the test pieces of Examples 1 to 3 each had a higher fracture strength than the test pieces of Comparative Examples 1 to 4 at the ordinary temperature and in the high temperature atmosphere. Similarly, the test piece of Example 4 had a higher fracture strength than the test pieces of Comparative Examples 5 and 6 at the ordinary temperature and in the high temperature atmosphere.

While specific forms of the embodiment of the present invention have been shown in the aforementioned inventive examples, the inventive examples are merely illustrative of the invention but not limitative of the invention. It is contemplated that various modifications apparent to those skilled in the art could be made within the scope of the invention.

The inventive glass-fiber-reinforced thermoplastic resin molding product has excellent mechanical strength in the high temperature atmosphere or in the moisture absorbed state even without imparting the molding product with a greater wall thickness or taking other measures, and has sufficient distortion resistance and sufficient strength as required for the ring-shaped structure. Therefore, the inventive glass-fiber-reinforced thermoplastic resin molding product is advantageously used as a transmission mount, a body mount, a carburetor mount, a member mount, a differential mount, a connecting rod, a torque rod, a torsional damper, a steering rubber coupling, a tension rod bush, a bush, a bound stopper, an FF engine roll stopper, a muffler hanger, a stabilizer link rod, a radiator support, a control arm or a suspension arm for a motor vehicle such as an automobile, or as other automotive bearing part having a ring-shaped structure.

What is claimed is:

1. A glass-fiber-reinforced thermoplastic polyamide resin molding product having a ring-shaped structure, and comprising:
  a thermoplastic polyamide resin; and
  a fibrous filler dispersed in the thermoplastic polyamide resin, the fibrous filler including:
  (A) 40 to 80% of glass fibers each having a length of at least 0.05 mm and less than 0.5 mm;
  (B) 15 to 40% of glass fibers each having a length of at least 0.5 mm and less than 1.0 mm;
  (C) 5 to 30% of glass fibers each having a length of at least 1.0 mm and less than 3.0 mm; and
  (D) at most 1% of glass fibers each having a length of at least 3.0 mm, based on a total number of fibers of the fibrous filler present in the molding product,
    wherein a weight average fiber length of glass fibers dispersed in an inner portion of the glass-fiber-reinforced thermoplastic polyamide resin molding product is greater than a weight average fiber length of glass fibers dispersed in a surface portion of the glass-fiber-reinforced thermoplastic polyamide resin molding product,
    wherein a difference between the weight average length of glass fibers dispersed in the inner portion of the glass-fiber-reinforced thermoplastic polyamide resin molding product and the weight average fiber length of glass fibers dispersed in the surface portion of the glass-fiber-reinforced thermoplastic polyamide resin molding product is greater than 0 mm to 0.3 mm,
    wherein the glass fibers each have a fiber diameter of 3 to 25 μm,
    wherein the glass fibers are present in a total proportion of in a range from 40 to 60 wt % in the molding product,
    wherein the weight average fiber length of the glass fibers dispersed in the surface portion of the glass-fiber-reinforced thermoplastic polyamide resin molding product is in a range from 0.4 to 1.5 mm, and
    wherein the weight average fiber length of the glass fibers dispersed in the inner portion of the glass-fiber-reinforced thermoplastic polyamide resin molding product is in a range from 0.5 to 2.8 mm.

2. The glass-fiber-reinforced thermoplastic polyamide resin molding product according to claim 1, which has a number average molecular weight (Mn) of 18000 to 27000.

3. The glass-fiber-reinforced thermoplastic polyamide resin molding product according to claim 1, wherein the thermoplastic polyamide resin has a number average molecular weight (Mn) of 19000 to 28000.

4. The glass-fiber-reinforced thermoplastic polyamide resin molding product according to claim 1, wherein a composition of the glass-fiber-reinforced thermoplastic polyamide resin molding product further contains terpene phenol.

5. The glass-fiber-reinforced thermoplastic polyamide resin molding product according to claim 4, wherein the proportion of terpene phenol is 1 to 10 wt % based on the weight of the overall composition of the glass-fiber-reinforced thermoplastic polyamide resin molding product.

6. The glass-fiber-reinforced thermoplastic polyamide resin molding product according to claim 1, which is an automotive bearing part.

7. The glass-fiber-reinforced thermoplastic polyamide resin molding product according to claim 1, wherein the thermoplastic polyamide resin comprises polyamide 66.

8. The glass-fiber-reinforced thermoplastic polyamide resin molding product according to claim 1, wherein the glass-fiber-reinforced thermoplastic polyamide resin molding product has a number average molecular weight (Mn) of 22000 to 25000.

9. The glass-fiber-reinforced thermoplastic polyamide resin molding product according to claim 1, wherein the thermoplastic polyamide resin has a number average molecular weight (Mn) of 22000 to 26000.

10. The glass-fiber-reinforced thermoplastic polyamide resin molding product according to claim 1, wherein the difference between the weight average length of glass fibers dispersed in the inner portion of the glass-fiber-reinforced thermoplastic polyamide resin molding product and the weight average fiber length of glass fibers dispersed in the surface portion of the glass-fiber-reinforced thermoplastic polyamide resin molding product is in a range of from 0.1 mm to 0.3 mm.

11. A method for producing the glass-fiber-reinforced thermoplastic polyamide resin molding product, the method comprising the steps of:
  directly feeding the glass fibers and the thermoplastic polyamide resin into an injection-molding machine; and
  injection-molding the resulting mixture to produce the glass-fiber-reinforced thermoplastic polyamide resin molding product according to claim 1.

12. The method for producing the glass-fiber-reinforced thermoplastic polyamide resin molding product according to claim 11, further comprising a step of directly feeding a terpene phenol into the injection molding machine and injection-molding the resulting mixture.

* * * * *